United States Patent
Nakajima

[11] Patent Number: 5,822,561
[45] Date of Patent: Oct. 13, 1998

[54] PIPELINE DATA PROCESSING APPARATUS AND METHOD FOR EXECUTING A PLURALITY OF DATA PROCESSES HAVING A DATA-DEPENDENT RELATIONSHIP

[75] Inventor: Masaitsu Nakajima, Osaka, Japan

[73] Assignee: Matsushita Electric Industrial Co., Ltd., Osaka, Japan

[21] Appl. No.: 609,746

[22] Filed: Mar. 1, 1996

[30] Foreign Application Priority Data

Mar. 3, 1995 [JP] Japan .................................... 7-043860

[51] Int. Cl.⁶ .................................................. G06F 9/38
[52] U.S. Cl. ...................... 395/395; 395/800.01
[58] Field of Search .............. 395/800.23, 394, 395/395, 553, 552, 800.01

[56] References Cited

U.S. PATENT DOCUMENTS

| | | | |
|---|---|---|---|
| 4,855,947 | 8/1989 | Zmyslowski et al. | 364/200 |
| 4,893,233 | 1/1990 | Denman | 395/395 |
| 5,269,007 | 12/1993 | Hanawa | 395/375 |
| 5,390,355 | 2/1995 | Horst | 395/800 |
| 5,404,552 | 4/1995 | Ikenaga | 395/800 |
| 5,471,593 | 11/1995 | Branigin | 395/375 |
| 5,564,056 | 10/1996 | Fetterman | 395/800 |
| 5,613,080 | 3/1997 | Ray | 395/390 |
| 5,659,782 | 8/1997 | Senter | 395/800.23 |
| 5,664,138 | 9/1997 | Yoshida | 395/395 |

FOREIGN PATENT DOCUMENTS

| | | |
|---|---|---|
| 0 312 764 | 4/1989 | European Pat. Off. . |
| 4-105126 | 4/1992 | Japan . |
| 4-276827 | 10/1992 | Japan . |

*Primary Examiner*—Eric Coleman
*Attorney, Agent, or Firm*—McDermott, Will & Emery

[57] ABSTRACT

A pipeline which allows one or more Through cycles to be assigned to pipeline stages is so constituted that a stage in which a data process is executed does not remain in a fixed position but shifts to an arbitrary stage. Consequently, even when a plurality of instructions to perform a plurality of data processes having a data-dependent relationship therebetween are issued simultaneously to a plurality of pipeline data processing circuits, the antecedent one of the data processes on which the subsequent one of the data processes is data-dependent is executed first by the pipeline processing circuit in charge of the antecedent data process and, at a point of time one cycle after the execution of the antecedent data process, the subsequent data process which is data-dependent on the antecedent data process is executed by the pipeline data processing circuit in charge of the subsequent data process. As a result, a large number of consecutive instructions can be issued without stagnation, so that a plurality of data processes having a data-dependent relationship therebetween can be executed at high speed.

27 Claims, 18 Drawing Sheets

Fig.11

| C = A + B | READ DATA A AND B | EXECUTION OF OPERATION A+B | Through | Through | WRITE DATA C |
| --- | --- | --- | --- | --- | --- |
| D = E + C | Dummy | READ DATA E AND C | EXECUTION OF OPERATION E+C | Through | WRITE DATA D |
| G = F + D | Dummy | Dummy | READ DATA F AND D | EXECUTION OF OPERATION F+D | WRITE DATA G |

Fig.12

|  | 1 | 2 | 3 | 4 | 5 | 6 | 7 | 8 | 9 | 10 |
|---|---|---|---|---|---|---|---|---|---|---|
| C=A+B | READ A AND B | OPERATION A+B | Through | Through | WRITE DATA C | 100 | | | | |
| E=C+D | Dummy | READ C AND D | OPERATION C+D | Through | WRITE DATA E | 101 | | | | |
| G=E+F | Dummy | Dummy | READ E AND F | OPERATION E+F | WRITE DATA G | 102 | | | | |
| J=H+I | | READ H AND I | OPERATION H+I | Through | Through | WRITE DATA J | 100 | | | |
| L=J+K | | | READ J AND K | OPERATION J+K | Through | Through | WRITE DATA L | 100 | | |
| N=L+M | | | Dummy | READ L AND M | OPERATION L+M | Through | WRITE DATA N | 101 | | |
| P=N+O | | | | Dummy | READ N AND O | OPERATION N+O | Through | WRITE DATA P | 100 | |
| S=Q+R | | | | READ Q AND R | OPERATION Q+R | Through | Through | WRITE DATA S | 102 | |
| U=S+T | | | | | READ S AND T | OPERATION S+T | Through | Through | WRITE DATA U | 101 |
| X=U+V | | | | | Dummy | READ U AND V | OPERATION U+V | Through | WRITE DATA X | 102 |

Fig.16

| | | | | | |
|---|---|---|---|---|---|
| C = A + B | READ A AND B | OPERATION A+B | Through | Through | WRITE DATA C |
| D = E + C (= E + A + B) | READ E, A, AND B | OPERATION E+A+B | Through | Through | WRITE DATA D |
| G = F + D | Dummy | READ F AND D | OPERATION F+D | Through | WRITE DATA G |
| H = I + G (= I + F + D) | Dummy | READ I, F, AND D | OPERATION I+F+D | Through | WRITE DATA H |
| J = K + H | Dummy | Dummy | READ K AND H | OPERATION K+H | WRITE DATA J |
| L = M + J (= M + K + H) | Dummy | Dummy | READ M, K, AND H | OPERATION M+K+H | WRITE DATA L |

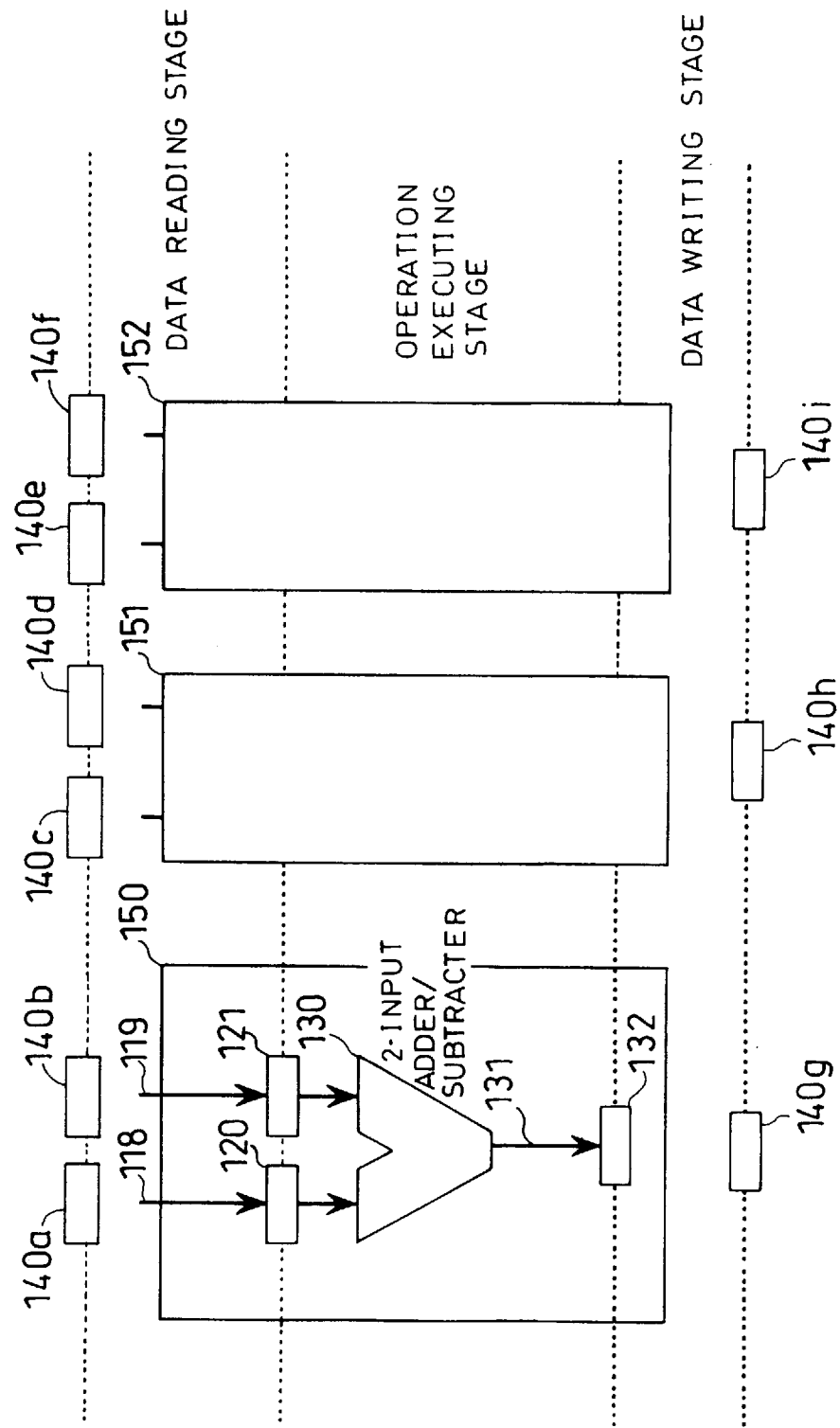

Fig.18(a)
PRIOR ART

C = A + B  | READ DATA A AND B | EXECUTION OF OPERATION A+B | WRITE DATA C |

D = E + F  | READ DATA E AND F | EXECUTION OF OPERATION E+F | WRITE DATA D |

G = H + I  | READ DATA H AND I | EXECUTION OF OPERATION H+I | WRITE DATA G |

Fig.18(b)
PRIOR ART

C = A + B  | READ DATA A AND B | EXECUTION OF OPERATION A+B | WRITE DATA C |

D = E + C  ← EXECUTION WAIT CYCLE → | READ DATA E AND C | EXECUTION OF OPERATION E+C | WRITE DATA D |

G = H + I  | READ DATA H AND I | EXECUTION OF OPERATION H+I | WRITE DATA G |

Fig.18(c)
PRIOR ART

C = A + B  | READ DATA A AND B | EXECUTION OF OPERATION A+B | WRITE DATA C |

D = E + C  ← EXECUTION WAIT CYCLE → | READ DATA E AND C | EXECUTION OF OPERATION E+C | WRITE DATA D |

G = H + I  ← EXECUTION WAIT CYCLE → | READ DATA H AND I | EXECUTION OF OPERATION H+I | WRITE DATA G |

PIPELINE DATA PROCESSING APPARATUS AND METHOD FOR EXECUTING A PLURALITY OF DATA PROCESSES HAVING A DATA-DEPENDENT RELATIONSHIP

BACKGROUND OF THE INVENTION

The present invention relates to an improved pipeline data processing apparatus and method for simultaneously executing a plurality of data processes by pipeline processing.

Recent years have seen remarkable improvements in the performance of microprocessors, to which improved clock frequencies and internal parallel processing have greatly contributed. The former improved clock frequencies may be attributed to the advancement of VLSI (Very-Large-Scale Integrated Circuit) technology represented by processing technology and high-speed circuit technology, while the latter internal parallel processing may be attributed mostly to the advancement of architecture technology represented by pipelining technology and super-scalar technology.

In the internal parallel processing, the above-mentioned pipelining technology is temporal parallel processing technology whereby a sequence of data processes are divided into a plurality of stages (pipelined) so that the plurality of data processes are performed in an overlapping manner. On the other hand, the super scalar technology is spatial parallel processing technology whereby a plurality of data processes are performed simultaneously in parallel. By using these two technologies in combination, the improvements in the performance of microprocessors have been achieved.

Referring now to FIG. 17, a description will be given to an example of the structure for spatially as well as temporally performing a plurality of data processes in parallel, which is obtained by applying the foregoing sparse color technology to a conventional pipeline data processing apparatus for temporally performing a plurality of data processes in parallel.

In the drawing are shown pipeline data processing circuits 150, 151, and 152 arranged in parallel to each other. The parallel arrangement enables the pipeline data processing circuit 150, 151, and 152 to spatially process three sets of data. Since the pipeline data processing circuits 150 to 152 have the same structure, a description will be given only to the internal structure of the pipeline data processing circuit 150 as a representative of the three circuits. In the pipeline data processing circuit 150, data is inputted to each of first and second input ports 118 and 119, first and second registers 120 and 121 store respective data inputted to the above input ports 118 and 119, a 2-input adder/subtracter 130 receives the respective data stored in the two registers 120 and 121 so as to perform addition or subtraction with respect to the respective data, and a register 132 receives an operation result 131 from the adder/subtracter 130.

In each of the above pipeline data processing circuits 150 to 152, a data process is pipelined in three stages which are: a data reading stage; an operation executing stage wherein the read data is subjected to addition or subtraction actually performed; and a data writing stage wherein an operation result is stored. In FIG. 17, registers 140a to 140f are for preliminarily storing respective data to be supplied to the 2-input adder/subtracter 130 of each of the pipeline data processing circuits 150 to 152 and subjected to an operation performed thereby, while registers 140g to 140i are for storing operation results outputted from the respective pipeline data processing circuits 150 to 152.

Below, a description will be given to the operation of the above conventional pipeline data processing apparatus shown in FIG. 17.

First, a consideration will be given to the case where three types of adding operations C, D, and G are executed by the first, second, and third pipeline data processing circuits 150, 151, and 152, respectively.

C=A+B

D=E+F

G=H+I.

Since the above three operations have no data-dependent relationship therebetween, they can be executed completely independently. Specifically, as shown in the operational timing chart of FIG. 18(a), the reading of data A and B, the reading of data E and F, and the reading of data H and I can be performed simultaneously in the data reading stage. Moreover, operation of A+B, operation of E+F, and operation of H+I can be executed simultaneously in the operation executing stage. Furthermore, the writing of data C, the writing of data D, and the writing of data G can be performed simultaneously in the data writing stage. In this manner, the three types of data processes can be executed in parallel by the three pipeline data processing circuits 150 to 152.

However, the above conventional pipeline data processing apparatus has the following disadvantages, which will be described below in detail. In the case where the execution sequence of the following three adding operations C, J, and G has been predetermined in this order, it is assumed that adding operation C is performed by the first pipeline data processing circuit 150, that adding operation J is performed by the second pipeline data processing circuit 151, and that adding operation G is performed by the third pipeline data processing circuit 152:

C=A+B

J=E+C

G=H+I.

Among the foregoing three types of operations, two operations C and J have a data-dependent relationship therebetween. Specifically, since the second operation J=E+C should be performed by using the result of the first operation C=A+B, the first operation C=A+B and the second operation J=E+C cannot be performed simultaneously. Consequently, as shown in the operational timing chart of FIG. 18(b), the second operation J=E+C should be initiated one cycle after the initiation of the first operation C=A+B.

The execution sequence of the second operation J and the third operation G is determined by either an Out-of-Order method or an In-Order method. The former method enables the execution sequence of a plurality of data processes to be changed, while the latter method follows the predetermined execution sequence of a plurality of data processes and inhibits the data processes from being transposed. In the case where the use of the Out-of-Order method is presumed, therefore, the third operation G=H+I can be performed simultaneously with the first operation C ahead of the second operation J, as shown in FIG. 18(b). In the case where the use of the In-Order method is presumed, on the other hand, the third operation G should not be performed ahead of but should be performed simultaneously with the second operation J, i.e., one cycle after the execution of the first operation C, since the transposition of the operations is inhibited.

As described above, in the conventional pipeline data processing apparatus, the plurality of operations C and J cannot simultaneously be executed whether the In-Order method or the Out-of-Order method is used. As a result, if a data-dependent relationship exists between a plurality of data processes, instructions to perform the respective operations C and J are not issued simultaneously to the respective pipeline data processing circuits 150 and 151 and the instruction to perform the second operation J is issued one cycle after the first instruction to perform the first operation C. In the case where the use of the In-Order method is presumed, on the other hand, an instruction to perform the subsequent third operation G having no data-dependent relationship is also issued one cycle after the instruction to perform the first operation C. Hence, the conventional pipeline data processing apparatus has the disadvantage of considerably low processing speed because a plurality of data processes having a data-dependent relationship therebetween cannot be performed at high speed.

SUMMARY OF THE INVENTION

It is therefore an object of the present invention to provide a pipeline data processing apparatus wherein, even when a data-dependent relationship exists between a plurality of data processes, a plurality of instructions to perform the processes can be issued simultaneously to respective pipeline data processing circuits such that the plurality of data processes can adequately be executed, whether the In-Order method or Out-of-Order method has been adopted. Moreover, even when a data process having no data-dependent relationship succeeds the data processes having a data-dependent relationship therebetween, the pipeline data processing apparatus enables an instruction to perform the succeeding data process to be issued simultaneously with the instructions to perform the preceding data processes having the data-dependent relationship therebetween, thereby improving the performance of processing speed.

To attain the above object, the present invention has adopted a structure provided with a plurality of stages obtained by adding a specified number of stages to the three stages which are a data reading stage, an operation executing stage, and a data writing stage such that the above data reading stage and operation executing stage can shift, if necessary, to an arbitrary stage in the plurality of stages.

Specifically, a pipeline data processing method of the present invention whereby a plurality of instructions to perform respective data processes are executed by a plurality of pipeline data processing circuits comprises the steps of: simultaneously issuing, when at least two data processes have a data-dependant relationship therebetween, instructions to perform the respective data processes to the respective pipeline data processing circuits; then executing first the antecedent one of the above data processes on which the subsequent one of the above data processes is data-dependent by the pipeline processing circuit in charge of the above antecedent data process; and subsequently executing, at a point of time one cycle after the execution of the above antecedent data process on which the above subsequent data process is data-dependent, the subsequent data process by the pipeline processing circuit in charge of the above subsequent data process.

A pipeline data processing apparatus of the present invention comprises: a plurality of pipeline processing circuits; and an instruction issue control portion for simultaneously issuing a plurality of instructions to perform respective data processes to the above respective pipeline processing circuits, wherein each of the above pipeline processing circuits comprises: an input data register for receiving and storing data from the outside; a data operating circuit for receiving the data stored in the above input data register and performing a specified operation with respect to the input data; an intermediate pipeline register disposed in a stage subsequent to the above data operating circuit; a final pipeline register disposed in a stage subsequent to the above intermediate pipeline register; and a path switching circuit for causing an operation result from the above data operating circuit to pass through or bypass the above intermediate pipeline register and inputting said operation result to the above final pipeline register, the above instruction issue control portion adding the number of Dummy stages to be inserted, in each of which nothing is executed, to each of the above instructions simultaneously issued, thereby enabling an operation executing stage in which the above data operating circuit performs the above specified operation to shift to an arbitrary stage in a plurality of pipeline stages.

With the above structure, a plurality of (e.g., three) pipeline data processing circuits are arranged in parallel according to the present invention. In the case where a data-dependent relationship exists between the plurality of (three) data processes (e.g., when operation C=A+B, operation J=E +C, and operation K=H+J), a plurality of instructions to perform the plurality of data processes are issued simultaneously to the above respective pipeline data processing circuits. In the pipeline data processing circuit for performing the first data process C, a data reading stage and an operation executing stage are assigned to the first and second stages, respectively. In the pipeline data processing circuit for performing the second data process J, the data reading stage and operation executing stage are assigned to the second and third stages. In the pipeline data processing circuit for performing the third data process K, the data reading stage and operation executing stage are assigned to the third and fourth stages. Consequently, the plurality of data processes C, J, and K are sequentially executed so that, even when a data-dependent relationship exists between these data processes, the data processes are adequately executed.

Here, the respective instructions to perform the above plurality of data processes C, J, and K are issued simultaneously and the subsequent instruction (i.e., the instruction to perform the fourth data process) is issued in the second cycle. In the conventional embodiment, the fourth instruction is issued in the fourth cycle. Consequently, according to the present invention, a large number of consecutive instructions can be issued without stagnation so that the plurality of data processes having a data-dependent relationship therebetween can be executed at high speed.

The above objects and novel features of the present invention will be more apparent from the reading of the following description in conjunction with the accompanying drawings.

BRIEF DESCRIPTION OF THE DRAWINGS

The accompanying drawings illustrate the preferred embodiments of the present invention.

In the drawings:

FIG. 11 is an operational timing chart in the case where three data processes are performed by a pipeline data processing apparatus according to the present invention;

FIG. 12 is an operational timing chart in the case where a large number of data processes are performed by a conventional pipeline data processing apparatus;

FIG. 16 is an operational timing chart in the case where six data processes are performed by the pipeline data processing apparatus according to the second embodiment of the present invention;

FIG. 17 shows the overall structure of a conventional pipeline data processing apparatus;

FIG. 18(a) is an operational timing chart showing a basic operation of the conventional pipeline data processing apparatus;

FIG. 18(b) is an operational timing chart showing another basic example of the conventional pipeline data processing apparatus; and FIG. 18(c) is an operational timing chart showing still another basic operation of the conventional pipeline data processing apparatus.

DETAILED DESCRIPTION OF THE INVENTION

Below, the preferred embodiments of the present invention will be described with reference to the drawings.

Figure 1:
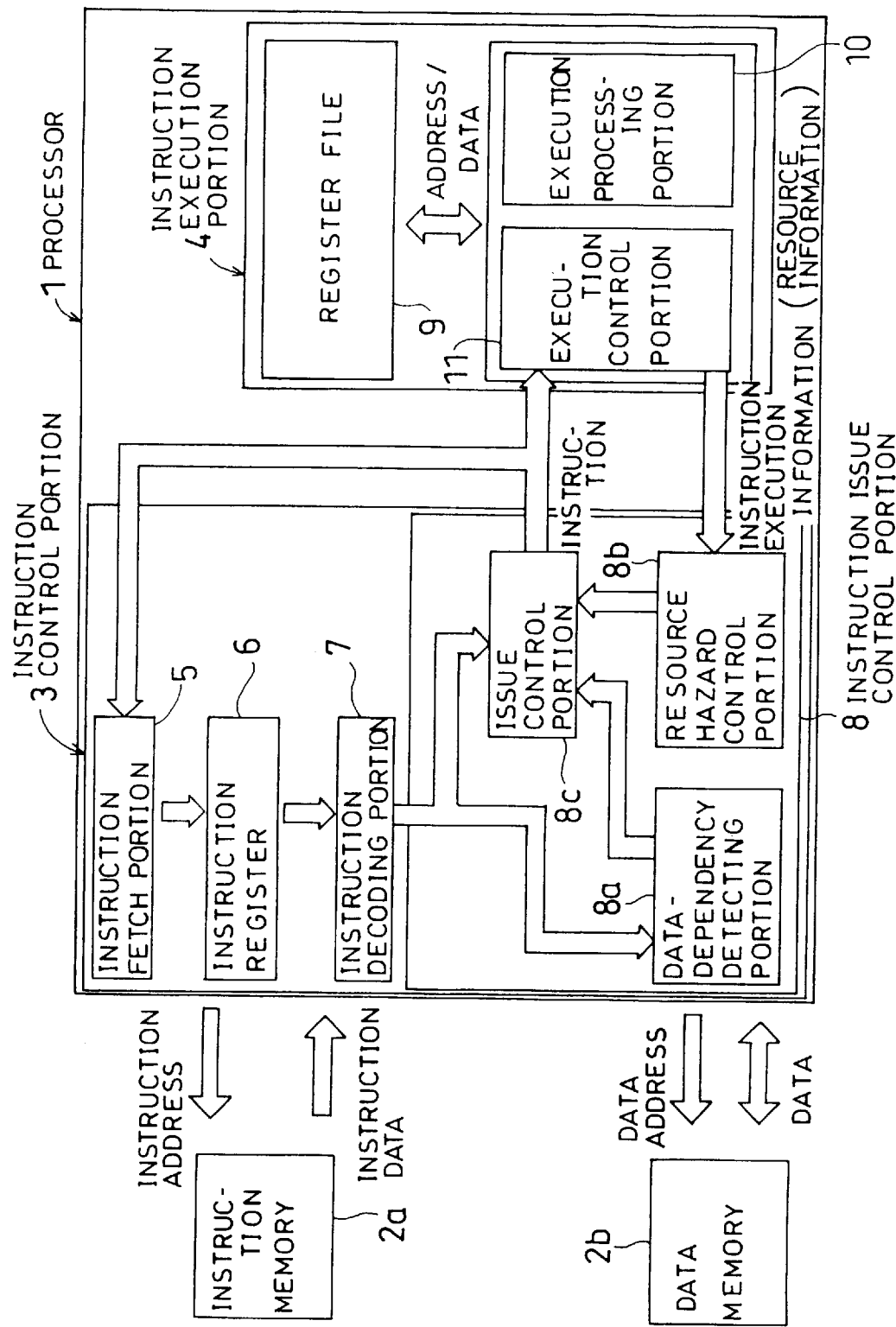
FIG. 1 shows the overall structure of a processor.

(First Embodiment of Pipeline Data Processing Apparatus)
FIG. 1 shows a first embodiment of the present invention, in which are shown: a processor 1; an instruction memory 2a for preliminarily storing an instruction program; and a data memory 2b for preliminarily storing a large number of data sets. It is not necessarily required to provide the above instruction memory 2a and data memory 2b as separate components. A large number of instructions and data sets may be stored together in a single memory.

The above processor 1 consists of an instruction control portion 3 and an instruction execution portion 4 for executing such an instruction to perform the processing of data. The above instruction control portion 3 consists of an instruction fetch portion 5, an instruction register 6, and an instruction decoding portion 7, and an instruction issue control portion 8. The above instruction fetch portion 5 generates one or a plurality of instruction addresses and transmits them to the above instruction memory 2a, while fetching one or a plurality of instructions necessary. The above fetched instructions are stored by the above instruction fetch portion 5 in the instruction register 6. The above instruction decoding portion 7 decodes every specified number (e.g., three) of instructions stored in the instruction register 6. The above instruction issue control portion 8 issues an instruction to the resource corresponding to the instruction based on the result of decoding. For example, if the instruction directs the processing of data, the instruction issue control portion 8 issues it to the above instruction execution portion 4. If the instruction is a branch instruction to control the stream of the instruction program, the instruction issue control portion 8 issues it to the instruction fetch portion 5. Moreover, if the operation of the above instruction issue control portion 8 is to be described roughly, it examines, when the instruction is to be issued to the instruction execution portion 4, the state of the resource required for executing the instruction in the instruction execution portion 4 and the presence or absence of a data-dependent relationship between a plurality of instruction data sets and issues only an executable instruction to the instruction execution portion 4. As for the internal structure and operation of the above instruction issue control portion 8, they will be described later in detail.

The above instruction execution portion 4 consists of a register file 9 for temporarily storing data, an execution processing portion 10 for performing an operation with respect to data and an execution control portion 11. The above execution control portion 11 loads data required by the execution processing portion 10 to perform an operation with respect to data from the above data memory 2b, while storing the data in the register file 9. In actual execution of the operation in the execution processing portion 10, the above execution control portion 11 reads data stored in the above register file 9 and controls the execution processing portion 10 so that the operation in accordance with the instruction is executed thereby and stores the operation result in the register file 9.

Figure 2:
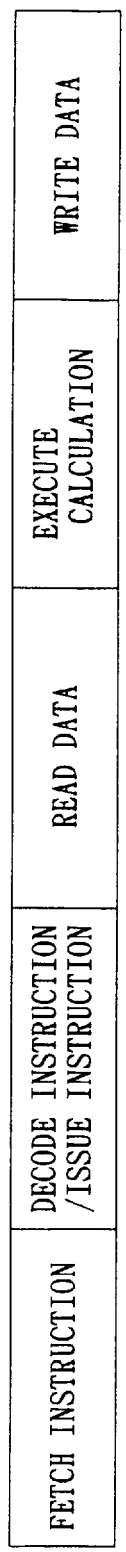
FIG. 2 illustrates the operation of pipelining operation.

In the above processor 1, the operation with respect to data is performed by pipelining processing. As shown in FIG. 2, the pipeline processing consists of five stages. In the first stage, an instruction is fetched. In the second stage, the instruction is decoded and issued. In the third stage, data is read from the register file 9. In the fourth stage, an operation is executed with respect to data. In the five stage, the operation result is written in the register file 9. The above second and third stages may be implemented by a single stage.

Figure 3:
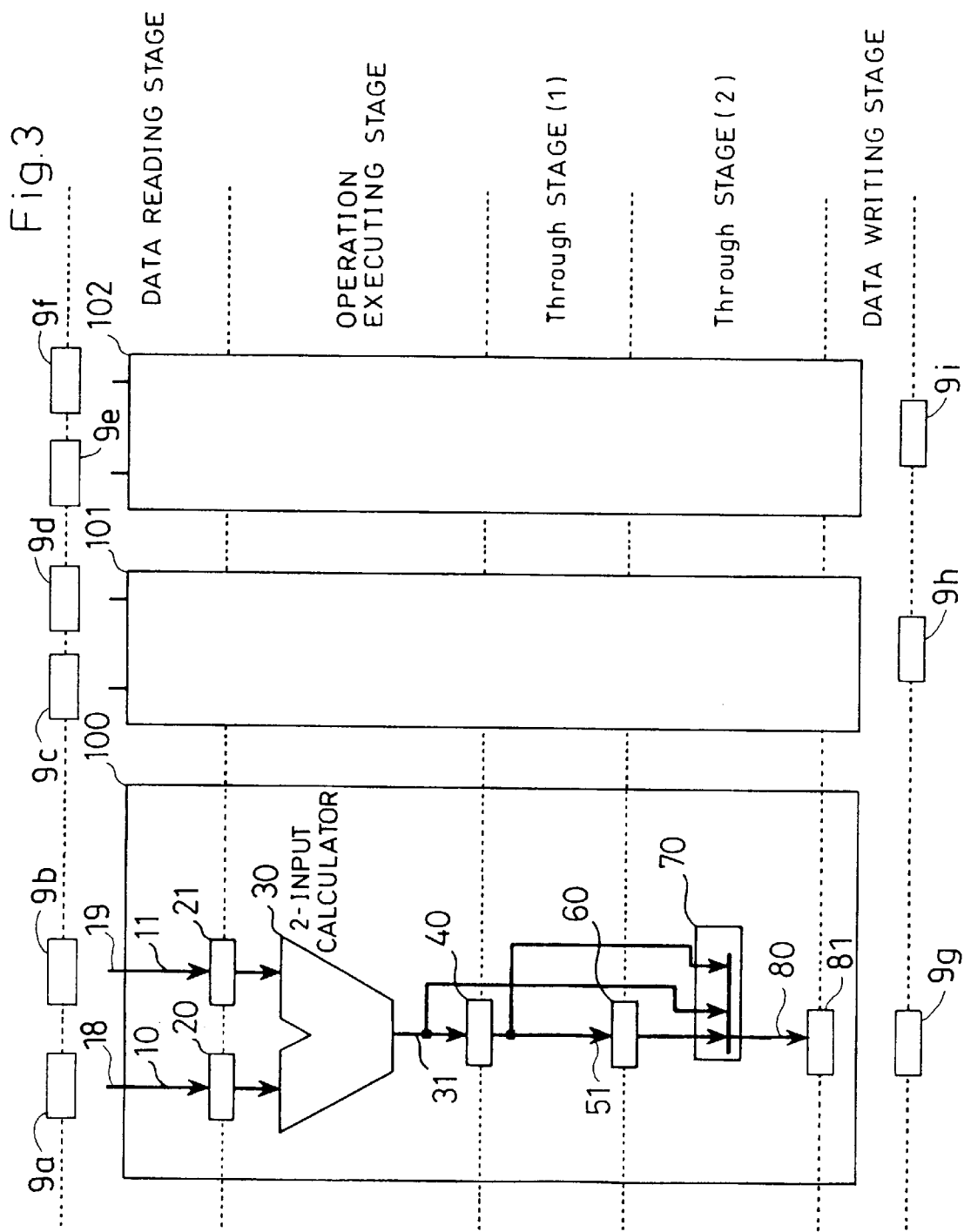
FIG. 3 shows the overall structure of a pipeline data processing apparatus according to a first embodiment of the present invention.

FIG. 3 shows a specific structure of the above execution processing portion 10 as a pipeline data processing apparatus of the present invention. In the drawing, reference numerals 100, 101, and 102 designate pipeline data processing circuits arranged in parallel to each other. Since the pipeline data processing circuits 100 to 102 have the same structure, a description will be given to the internal structure of the pipeline data processing circuit 100 as a representative of the three circuits. In the drawing are shown: first and second data input ports 18 and 19 for receiving data from the above register file 9; first and second data input registers 20 and 21 for storing respective sets of data received from the above respective data input ports 18 and 19; and a 2-input calculator (data calculating circuit) for receiving the respective sets of data stored in the above two data input registers 20 and 21 and executing addition or subtraction with respect to the respective sets of data.

In the drawing are also shown: a first (intermediate) pipeline register 40 disposed in a stage subsequent to the above calculator 30; a second (intermediate) pipeline register 60 disposed in a stage subsequent to the above first pipeline register 40; and a selector (path switching circuit) 70 disposed in a stage subsequent to the second pipeline register 60. The above first pipeline register 40 receives a data operation result 31 outputted from the above calculator 30 and stores it. The above second pipeline register 60 receives the output data from the above first pipeline register 40 and stores it. The above selector 70 receives the data operation result 31 outputted from the above calculator 30 and the respective sets of data stored in the above first and second pipeline registers 40 and 60, selects any one of the three, and outputs the selected one. In the drawing, a reference numeral 81 designates a final pipeline register for receiving the output data 80 from the above selector 70 and stores it.

Figure 4:
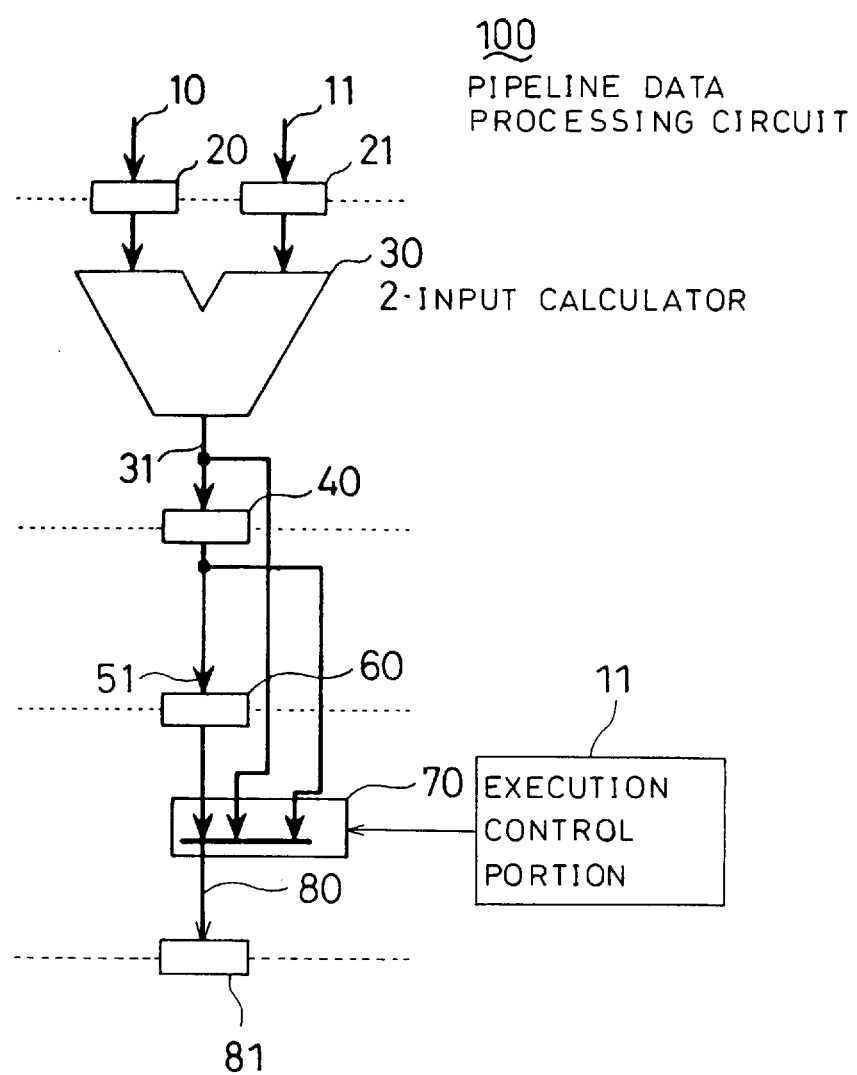
FIG. 4 shows the internal structure of a pipeline data processing circuit constituting the pipeline data processing apparatus.

In each of the above pipeline data processing circuits 100 to 102, the above registers 20, 21, 40, and 60 and selector 70 provided therein are controlled by the above execution control portion 11 of FIG. 1 (FIG. 4 shows only the pipeline data processing circuit 100). Reference numerals 9a to 9i designate registers in the above register file 9.

Figure 5:
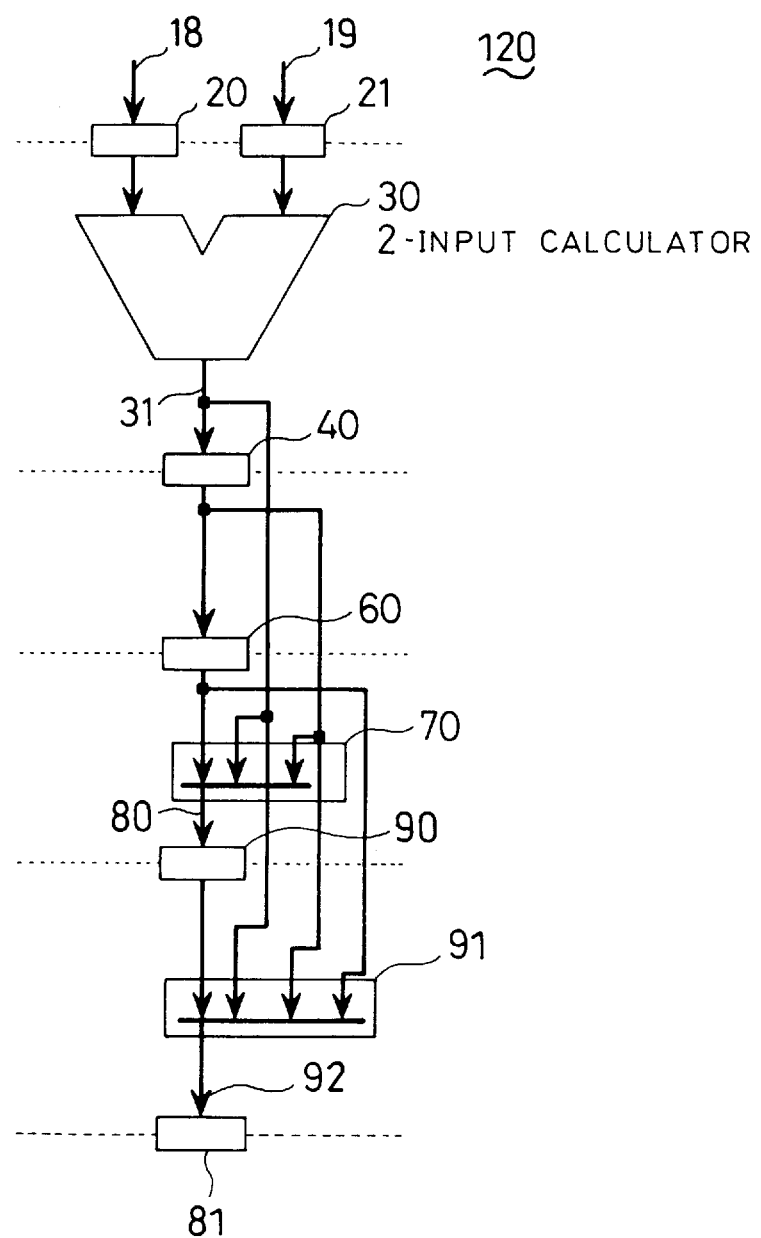
FIG. 5 shows a first variation of the pipeline data processing circuit.
Figure 6:
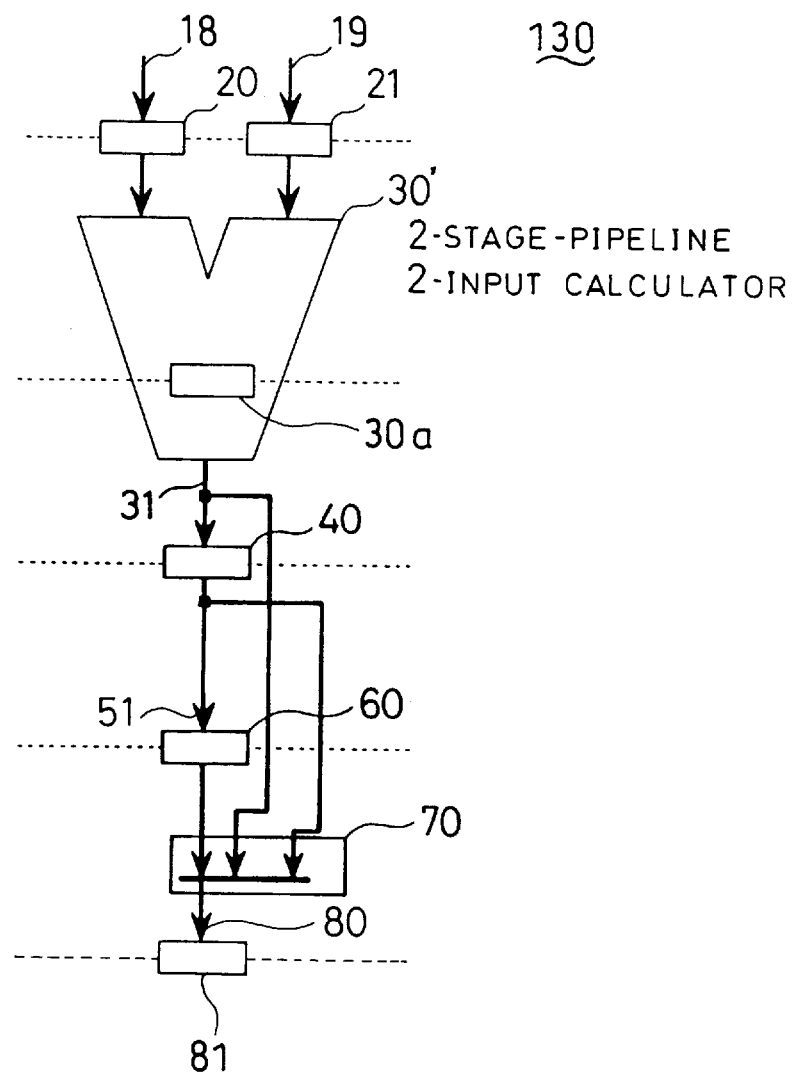
FIG. 6 shows a second variation of the pipeline data processing circuit.
Figure 7:
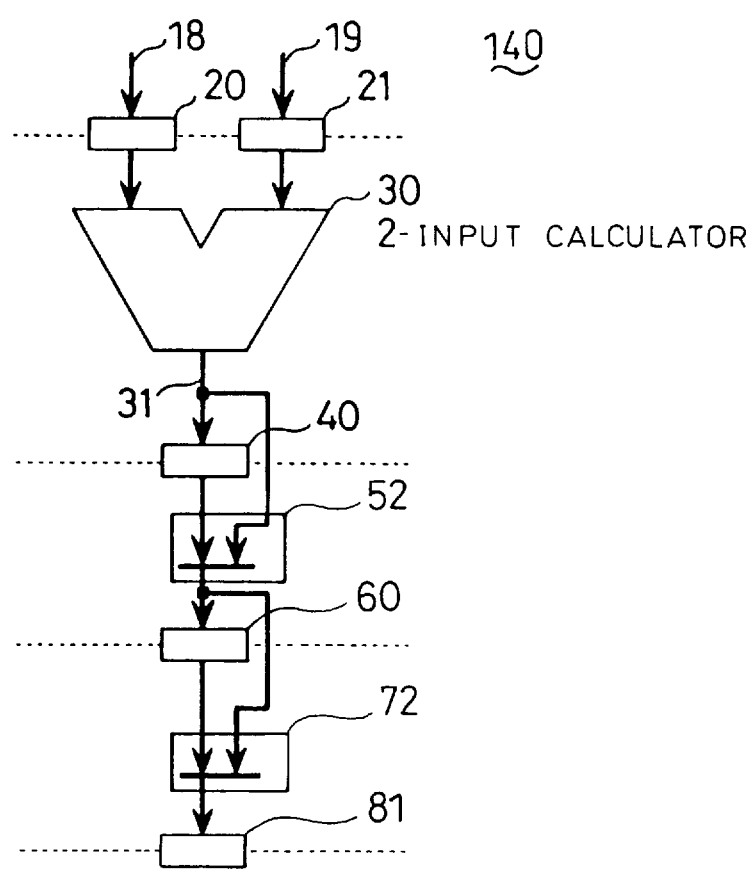
FIG. 7 shows a third variation of the pipeline data processing circuit.

The above pipeline data processing circuit 100 may also be composed of any of the pipeline data processing circuits shown in FIGS. 5 to 7. The pipeline data processing circuit 120 shown in FIG. 5 is obtained by increasing the number of pipeline stages of the pipeline data processing circuit 100 of FIG. 4 by one. Specifically, in FIG. 4, an additional pipeline register 90 and an additional selector (path switching circuit) 91 are provided between the selector 70 and the final pipeline register 81. The above additional pipeline register 90 receives the result of selection from the selector 70 and stores it. The above additional selector 91 receives the operation result 31 from the calculator 30 and the respective sets of data stored in the intermediate (first and second) pipeline register 40 and 60 and in the additional pipeline register 90, selects any one of the three, and outputs the selected one. The output 92 from the second selector 90 is inputted to the final pipeline register 81 and stored therein. The pipeline data processing circuit 130 of FIG. 6 is obtained by providing a pipeline register 30a in the calculator 30' for execution of addition or subtraction in a 2-stage pipeline. In the pipeline data processing circuit 140 of FIG. 7, a first selector 52 is interposed between the first and second pipeline registers 40 and 60 and a second selector 72 is interposed between the second and final pipeline registers 60 and 81. The above first selector 52 receives the operation result from the calculator 30 and the data stored in the previous-stage (first) pipeline register 40, selects either one of the two, and outputs the selected one. The above second selector 72 receives the result of selection from the above first selector 52 and the data stored in the previous-stage (second) pipeline register 60, selects either one of the two, and outputs it to the final pipeline register 81. The calculator 30 in each of the above pipeline data processing circuits 120 and 140 of FIGS. 5 and 7 may also be composed of the calculator 30' in the pipeline data processing circuit 130 of FIG. 6. To compose the three pipeline data processing circuits 100 to 102 shown in FIG. 1, any one or some of the processing circuits 120 to 140 described above may be used singly or in combination. However, in the case where some of the processing circuits 120 to 140 are used in combination to compose the pipeline data processing circuits 100 to 102, their pipelines should have the same number of stages.

Next, a description will be given to the execution of one operation by the single pipeline data processing circuit (100, for example) before a description will be given to the operation of the pipeline data processing apparatus shown in FIG. 3 wherein a plurality of operations are performed in parallel. Since the pipeline data processing circuits shown in FIG. 4 to FIG. 7 exhibit the same basic operation, a description will be given below to the pipeline data processing circuit 100 of FIG. 4 as a representative.

Figure 8:
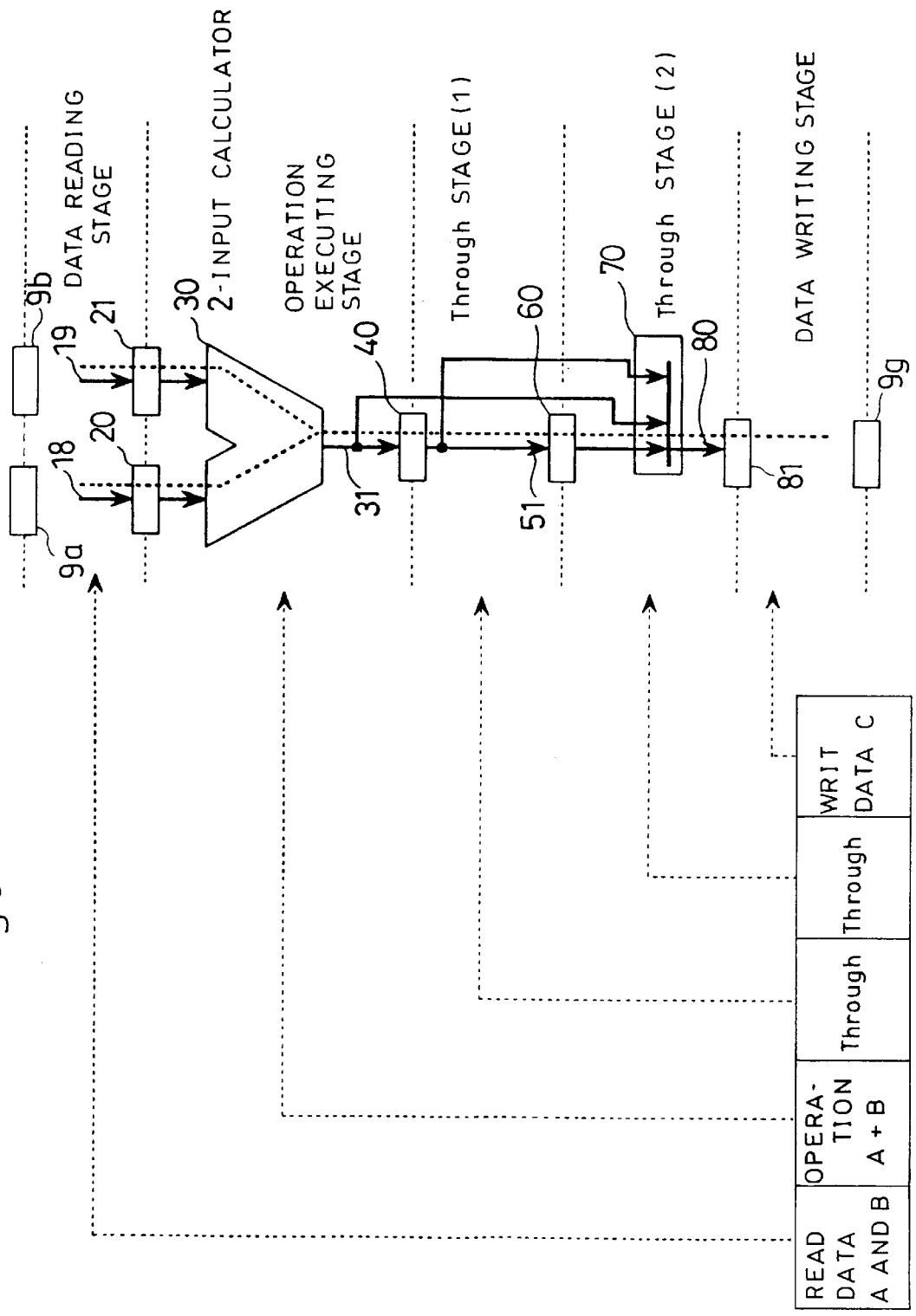
FIG. 8 is a timing chart showing a basic operation of the pipeline data processing circuit.
Figure 9:
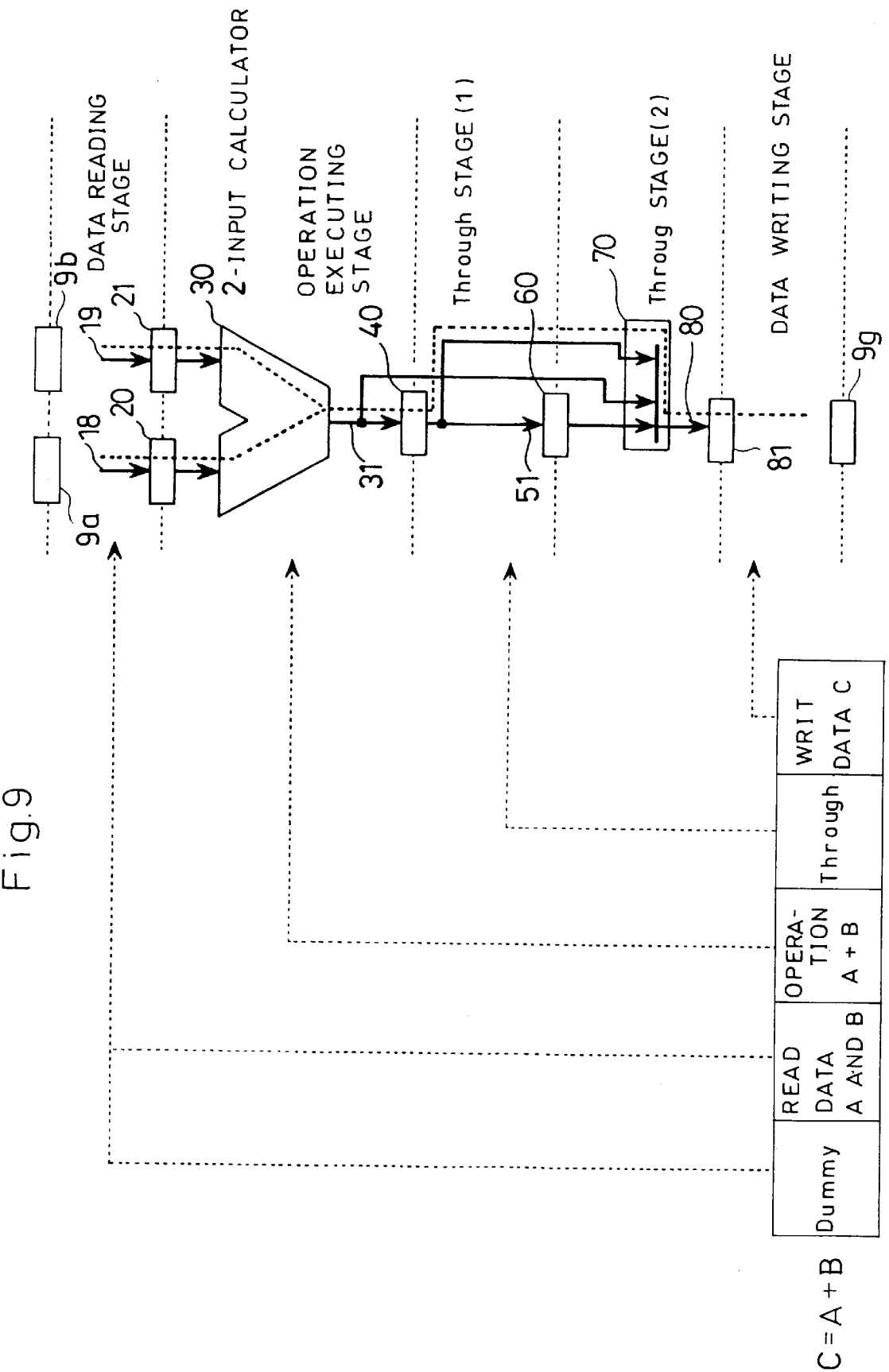
FIG. 9 is a timing chart showing another basic operation of the pipeline data processing circuit.
Figure 10:
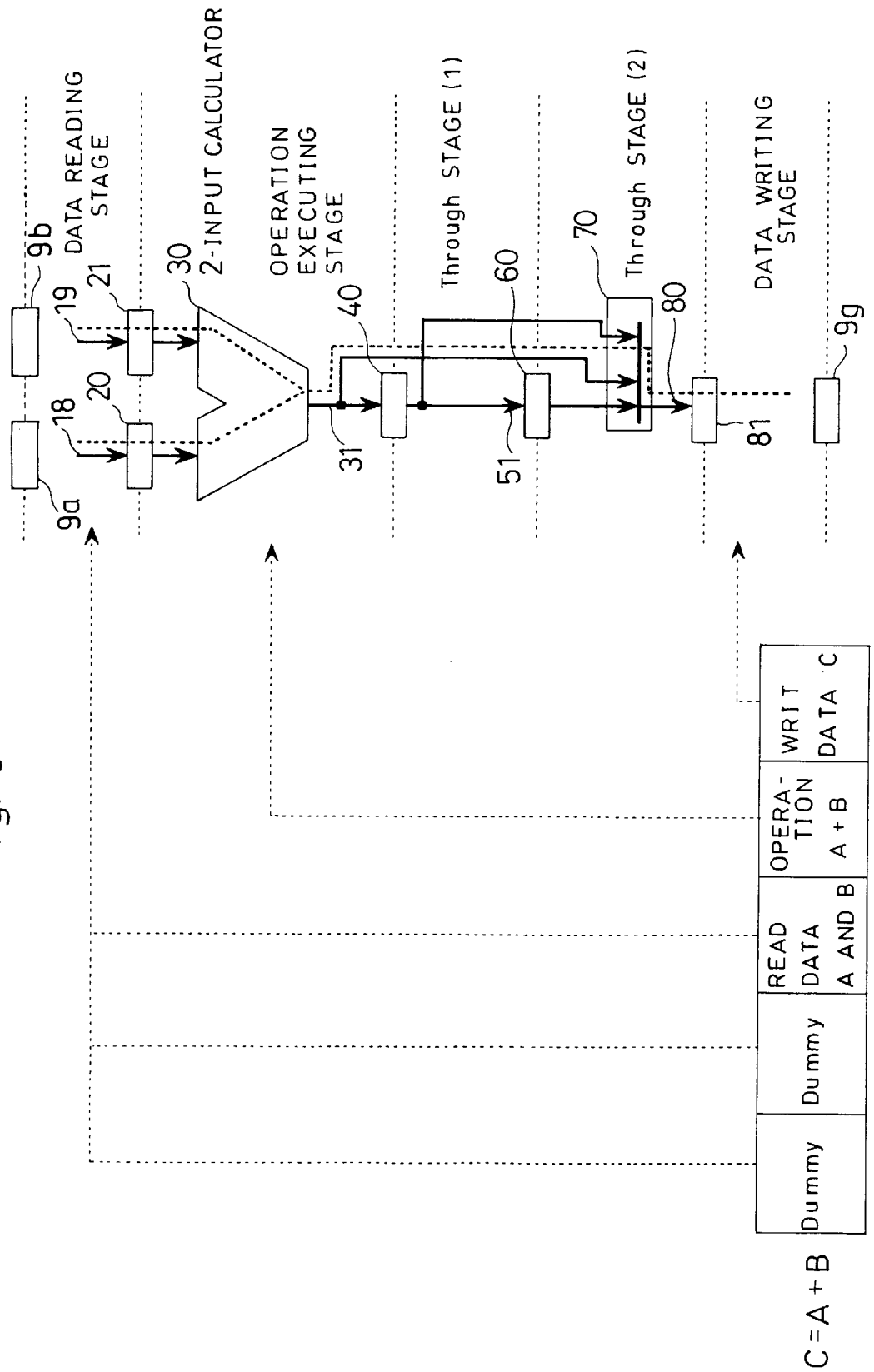
FIG. 10 is a timing chart showing still another basic operation of the pipeline data processing circuit.

The pipeline data processing circuit 100 enables the execution of data processing with three timings shown in FIGS. 8, 9, and 10. In FIGS. 8 to 10, respective cycles for illustrating the timings for the pipeline processing are designated as first to fifth cycles, while respective stages in hardware for illustrating a flow of data in the pipeline data processing circuit 100 are designated as a data reading stage, an operation executing stage, a Trough (1) stage (first pass stage), a Trough (2) stage (second pass stage), and a data writing stage for the convenience of illustration. A data process is basically executed in five pipeline stages. In FIGS. 8 to 10, the timing for the pipeline processing is associated with an actual flow of data in the pipeline data processing circuit.

FIG. 8 shows the most basic operation of the pipeline data processing circuit 100. The data processing (e.g., operation C=A+B) is executed as follows: The selector 70 selects the output from the second pipeline register 60. In the first cycle, data A and B is read and stored in the respective input registers 20 and 21 in the data reading stage. In the second cycle, the operation of A+B is executed in the operation executing stage and the operation result C is stored in the first pipeline register 40. In the third cycle, data (operation result C) passes through the Trough (1) stage and is stored as it is in the second pipeline register 60. In the fourth cycle, data (operation result C) passes through the Trough (2) stage and is stored as it is in the third pipeline register 81. Thus, in the two Trough stages, no processing is performed with respect to the data (operation result C) and the data simply shifts to the subsequent stages in sequence. In the fifth cycle, the operation result C is written in the data writing stage. In FIG. 8, the data flows in the pipeline data processing circuit 100 without stagnation.

In FIG. 9, the first cycle of the five-stage pipeline is used as a Dummy cycle. The selector 70 selects the output from the first pipeline register 40. In the first cycle (Dummy cycle), nothing is executed so that the pipeline is on hold. As a result, even when the timing proceeds to the subsequent second cycle, the data does not actually shift from the data reading stage to the subsequent operation executing stage. It is not until in the second cycle that the data A and B is read in the data reading stage and stored in the respective registers 20 and 21. In the third cycle, operation of A+B is executed in the operation executing stage and the operation result C is stored in the first pipeline register 40. In the fourth cycle, the operation result C passes through the Trough (1) stage and is stored in the third pipeline register 81 via the selector 70. In the fifth cycle, the operation result C is written in the data writing stage. Briefly, the data from the Trough (1) stage (i.e., the operation result C stored in the first pipeline register 40) bypasses the Trough (2) stage and shifts to the data writing stage.

Here, it should be noted that, when the first cycle is a Dummy cycle, the data J and K for the subsequent data process (e.g., L=J+K) cannot be inputted in the second cycle. In this case, since the data reading stage is reached only in the second cycle, the subsequent data J and K can be inputted only when the data A and B currently executed shifts to the operation executing stage, i.e., the third cycle.

FIG. 10 illustrates the operation when Dummy cycles are assigned to the first and second cycles. The selector 70 selects the output from the calculator 30. In the first and second cycles (Dummy cycles), nothing is executed so that the pipeline is on hold. As a result, even when the timing proceeds to the subsequent third cycle, the data A and B does not actually shift from the data reading stage to the operation executing stage. It is not until in the third cycle that the data A and B is read and stored in the respective registers 20 and 21 in the data reading stage. In the fourth cycle, operation of A+B is executed in the operation executing stage and the operation result C is stored in the third pipeline register 80 via the selector 70. In the fifth cycle, the above operation result C is written in the data writing stage. Briefly, the data from the operation executing stage (operation result C) bypasses the Trough (1) and (2) stages and shifts to the data writing stage.

Here, it should be noted that, when the first and second cycles are Dummy cycles, the data for the subsequent data process cannot be inputted until the third cycle is initiated. In this case, since the data read cycle is reached for the first time in the third cycle, the subsequent data can be inputted only when the data A and B currently executed shifts to the operation executing stage, i.e., the fourth cycle.

Next, a description will be given to the internal structure of the above instruction issue control portion 8 of FIG. 1. As shown in the drawing, the instruction issue control portion 8 comprises; a data-dependency detecting portion 8a; a resource hazard control portion 8b; and an issue control portion 8c. The above data-dependency detecting portion 8a receives information obtained through the decoding of a plurality of (three) instructions from the above instruction decoding portion 7 and judges, based on the information, the presence or absence of a data-dependent relationship between the data processes (e.g., C=A+B,E=C+D, and G=E+F) directed by the three instructions. The above resource hazard control portion 8b receives a signal representing that any of the above pipeline data processing circuits 100 to 102 is executing the Dummy cycle shown in FIGS. 9 and 10 (Dummy-cycle-execution signal), judges that there is a resource hazard on receipt of the signal, and outputs the resource hazard signal to the issue control portion 8c. The above issue control portion 8c judges whether or not each of the pipeline data processing circuits 100 to 102 is in the executable state in which the instruction is executable and further judges, if it has judged that the instruction is executable, whether or not the above Dummy cycle shown in FIGS. 9 and 10 should be inserted. If the Dummy cycle should be inserted, the issue control portion 8c determines the number of Dummy cycles to be inserted and adds the number to the instruction and outputs one or a plurality of instructions to the above execution control portion 11 such that the instruction or instructions are executed in the pipeline data processing circuit or circuits in the executable state.

Specifically, the above issue control portion 8c judges whether or not each of the pipeline data processing circuits 100 to 102 is in the executable state by examining whether or not each of the pipeline data processing circuits 100 to 102 is executing a Dummy cycle. If each of the pipeline data processing circuits 100 to 102 is not executing a Dummy cycle, the issue control portion 8c judges that it is in the executable state.

The insertion or no insertion of a Dummy cycle and the number of Dummy cycles to be inserted are determined in the following manner. First, it is judged whether or not a data-dependent relationship exists between the data process previously executed and the data process to be subsequently executed or between a plurality of data processes to be simultaneously executed. If there is no data-dependent relationship, it is determined that the number of Dummy cycles is 0, which indicates that no Dummy cycle should be inserted. If there is any data-dependent relationship, on the other hand, the number of Dummy cycles to be inserted is determined as follows: For ease of understanding, a consideration will be given to the case where three data processes C=A+B,D=E+C, and G=F+D are executed in orderly sequence, as shown in FIG. 11. The number of Dummy cycles to be inserted is determined first for the data process to be executed with the highest priority and then determined sequentially for the other processes with lower priorities. If the number of pipeline stages of the calculator 30 in the pipeline data processing circuit (which is "1" in the pipeline data processing circuit of FIG. 4 and is "2" in the pipeline data processing circuit of FIG. 6) for executing the data process D (or G) which has a data-dependent relationship with the antecedent data process C (or D) is designated at a (by way of example, a description will be given hereinafter to the pipeline data processing circuit of FIG. 4 in which a=1), the number of Dummy cycles to be inserted in the antecedent data process C (or D) which is executed by the pipeline data processing circuit and on which the subsequent data process D (or G) is data-dependent is designated at b, and a difference in the initiating cycles of the above data processes having a data-dependent relationship (C and D or D and G) is designated at c, the number x of Dummy cycles can be calculated by the following equation:

$$x = a + b - c.$$

In the above example shown in FIG. 11, since the first data process C=A+B has no antecedent data process on which it is data-dependent, the number of Dummy cycles is "0". As for the second data process D=E+C which has a data-dependent relationship with the first data process C, the number b of Dummy cycles to be inserted in the data process C is "0" and the difference c in the initiating cycles of the two data processes is "0" (simultaneous execution), so that the number x of Dummy cycles to be calculated becomes 1+0−0=1. As for the third data process G=F+D which has a data-dependent relationship with the antecedent data process D, the number b of Dummy cycles to be inserted in the data process D on which the data process G is dependent is "1" and a difference c in the initiating cycles of the two processes is "0" (simultaneous execution), so that the number x of Dummy cycles to be calculated becomes 1+1−0=2.

As will be appreciated from FIG. 11, of the three data processes C, D, and G, the first data process C is executed with the timing of FIG. 8, the second data process D which has a data-dependent relationship with the antecedent process C is executed with the timing of FIG. 9, and the third data process G which has a data-dependent relationship with the antecedent process D is executed with the timing of FIG. 10. Consequently, even when respective instructions to perform the three data processes C, D, and G having a data-dependent relationship therebetween are issued simultaneously, they can be executed without stagnation. The data processes C, D, and G are completed at the same time, so that the In-Order method is surely implemented.

In FIG. 1, the execution control portion 11 receives an instruction issued from the issue control portion 8c and causes that one of the pipeline data processing circuits 100 to 102 which is designated by the instruction to execute the data process directed by the instruction. The above execution control portion 11 controls the selector 70 of the above designated pipeline data processing circuit so that the output from the second pipeline register 60 is selected when the number x of Dummy cycles that has been added to the corresponding instruction is 0, that the output from the first pipeline register 40 is selected when the number x of Dummy cycles is 1, and that the output from the calculator 30 (operation result) is selected when the number x of Dummy cycles is 2. If any of the pipeline data processing circuits 100 to 102 is executing a Dummy cycle, the above execution control portion 11 transmits a Dummy-cycle-execution signal to the above resource hazard control portion 8b.

Next, referring to FIG. 12, the operation of the pipeline data processing apparatus of the present embodiment will be described by using a more complicated data processing sequence:

$$C=A+B \quad (1)$$
$$E=C+D \quad (2)$$
$$G=E+F \quad (3)$$
$$J=H+I \quad (4)$$
$$L=J+K \quad (5)$$
$$N=L+M \quad (6)$$
$$P=N+O \quad (7)$$
$$S=Q+R \quad (8)$$
$$U=S+T \quad (9)$$
$$X=U+V \quad (10).$$

Of these ten data processes, each of the data processes except the data processes (1), (4), and (8) has a data-dependent relationship with the antecedent data process.

In FIG. 12, three instructions to perform the data processes C, E, and G are decoded first and issued simultaneously. The first data process C, the second data process E, and the third data process G proceed in the pipeline data processing circuits 100, 101, and 102, respectively. Among these, a data-dependent relationship exists between the first and second data processes C and E, while a data-dependent relationship also exists between the second and third data processes E and G. The number x of Dummy cycles to be inserted in the pipeline data processing circuit 101 becomes 1, since a=1, b=0, and c=0 in the above equation for calculation. The number x of Dummy cycles to be inserted in the pipeline data processing circuit 102 becomes 2, since a=1, b=1, and c=0 in the above equation for calculation.

In the first cycle, three instructions to perform the subsequent three data processes J, L, and N are decoded. Since the two pipeline data processing circuits 101 and 102 are executing Dummy cycles, resource hazard signals are generated for these processing circuits 101 and 102. In response to these, only an instruction to perform the fourth data process J is issued so that the data process J proceeds in the pipeline data processing circuit 100. Since the fourth data process J has no data-dependent relationship with any of the existing data processes C, E, and G, the number x of Dummy cycles is 0 in the pipeline data processing circuit 100 for performing the data process J.

In the second cycle, the other two instructions that have not been issued in the preceding cycle and an instruction to perform the seventh data process P are decoded. Since only the pipeline data processing circuit 102 is executing a Dummy cycle, a resource hazard signal is generated for the processing circuit 102. In response to this, two instructions to perform the fifth and sixth data processes L and N are issued and the data processes L and N proceed in the pipeline data processing circuits 100 and 101, respectively. Here, a data-dependent relationship exists between the fourth and fifth data processes L and N, while a data-dependent relationship also exists between the fifth and sixth data processes L and N. Consequently, the number x of Dummy cycles to be inserted in the pipeline data processing circuit 100 becomes 0, since a=1,b=0, and c=1 in the above equation for calculation. The number x of Dummy cycles to be inserted in the pipeline data processing circuit 101 becomes 1, since a=1, b=0, and c=0 in the above equation for calculation.

In the third cycle, the other instruction that has not been issued in the preceding cycle and instructions to perform the eighth and ninth data processes S and U are decoded. Since only the pipeline data processing circuit 101 is executing a Dummy cycle, a resource hazard signal is generated for the processing circuit 101. In response to this, two instructions to perform the seventh and eighth data processes P and S are issued so that the data processes P and S proceed in the pipeline data processing circuits 100 and 102, respectively. Here, a data-dependent relationship exists between the seventh and eighth data processes N and P. Consequently, the number x of Dummy cycles to be inserted in the pipeline data processing circuit 100 becomes 1, since a=1, b=1, and c=1. On the other hand, the number x of Dummy cycles to be inserted in the pipeline data processing circuit 102 is 0, since no data-dependent relationship exists between the seventh and eighth data processes P and S.

In the fourth cycle, the other instruction that has not been issued in the preceding cycle and an instruction to perform the tenth data process X are decoded. Since only the pipeline data processing circuit 100 is executing a Dummy cycle, a resource hazard signal is generated for the processing circuit 100. In response to this, two instructions to perform the ninth and tenth data processes U and X are issued so that the data processes U and X proceed in the pipeline data processing circuits 101 and 102, respectively. Here, a data-dependent relationship exits between the eighth and ninth data processes S and U, while a data-dependent relationship also exists between the ninth and tenth data processes U and X. Consequently, the number x of Dummy cycles to be inserted in the pipeline data processing circuit 101 becomes 0, since a=1, b=0, and c=1 in the above equation for calculation. On the other hand, the number x of Dummy cycles to be inserted in the pipeline data processing circuit 102 becomes 1, since a=1, b =0, and c=0 in the above equation for calculation.

In the present embodiment, the point of time at which all the instructions to perform the ten data processes have been issued falls in the fifth cycle, while the point of time at which the execution of all the data processes has been completed falls in the ninth cycle, as will be appreciated from FIG. 12. On the other hand, if the above data processing sequence is executed using the conventional pipeline data processing apparatus of FIG. 17, the point of time at which all the ten data processes have been issued falls in the eighth cycle, while the point of time at which the execution of all the data processes have been completed falls in the tenth cycle, as shown in the timing chart of FIG. 13.

Figure 13:
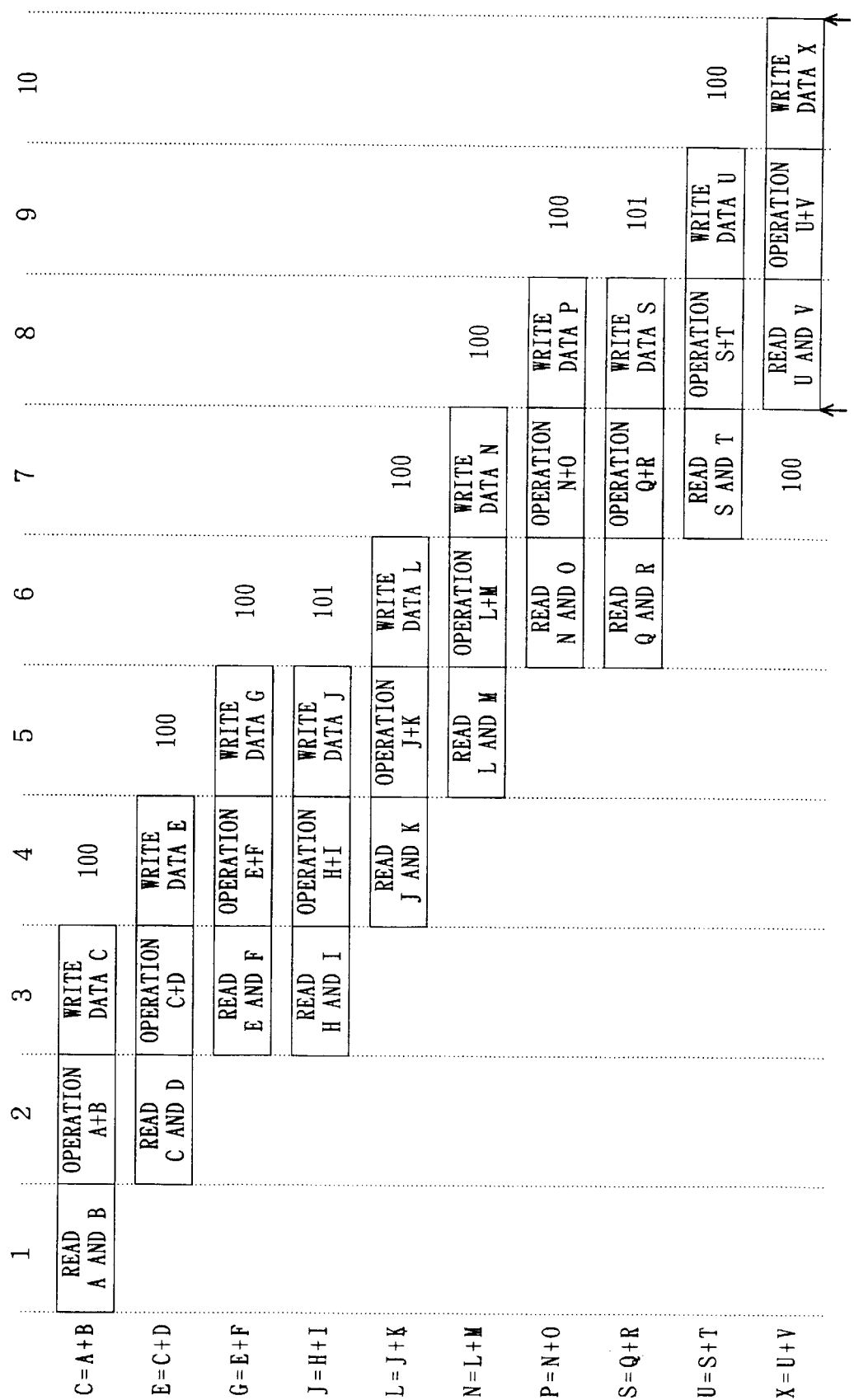
FIG. 13 is an operational timing chart in the case where a plurality of data processes are performed by the conventional pipeline data processing apparatus.

From a comparison of the embodiment of the present invention shown in FIG. 12 to the conventional embodiment shown in FIG. 13, it will be appreciated that the pipeline data processing apparatus in the embodiment of the present invention has an advantage over the conventional embodiment in terms of the performance of operating speed.

(Second Embodiment of Pipeline Data Processing Apparatus)

Figure 14:
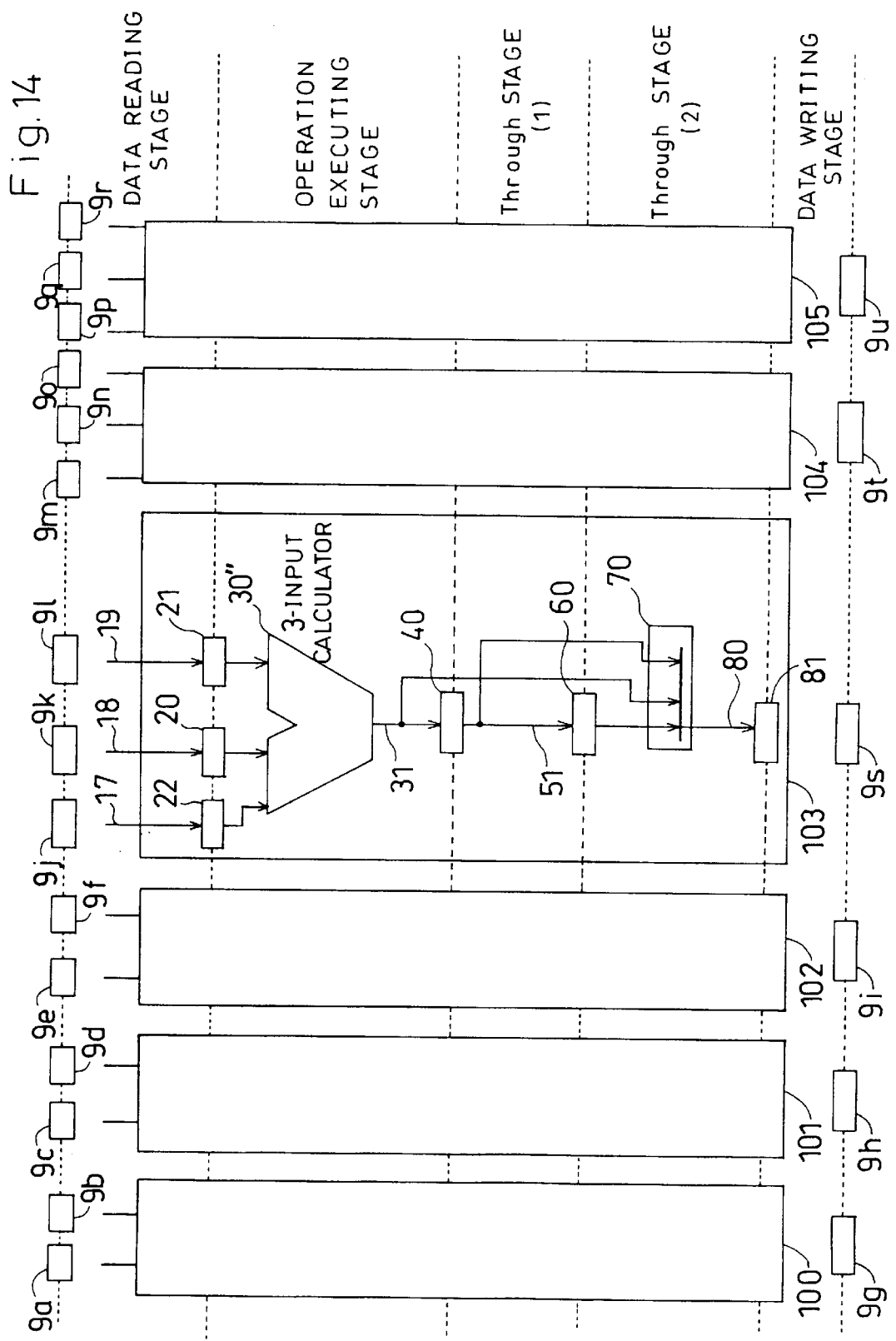
FIG. 14 shows the overall structure of a pipeline data processing apparatus according to a second embodiment of the present invention.

FIG. 14 shows a pipeline data processing apparatus showing a second embodiment of the present invention.

In the present embodiment, three additional pipeline data processing circuits 103 to 105 having the same structure are provided in parallel in the structure of FIG. 1. Each of the pipeline data processing circuits 103 to 105 has a multi-input calculator 30" having three or more inputs (three inputs in the drawing). In compliance with the 3-input calculator 30", there have been provided three data input ports 17 to 19 and three data input registers 20 to 22 each for storing data inputted to the corresponding data input port. The data stored in the data input registers 20 to 22 is inputted to the above 3-input calculator 30" and subjected to addition or subtraction. As for the other components, they are the same as those of the pipeline data processing circuit of the first embodiment shown in FIG. 4, so that the description thereof will be omitted by providing the same components with the same reference numerals. In FIG. 14, reference numerals 9j tp 9r designate registers in the register file 9.

Figure 15:
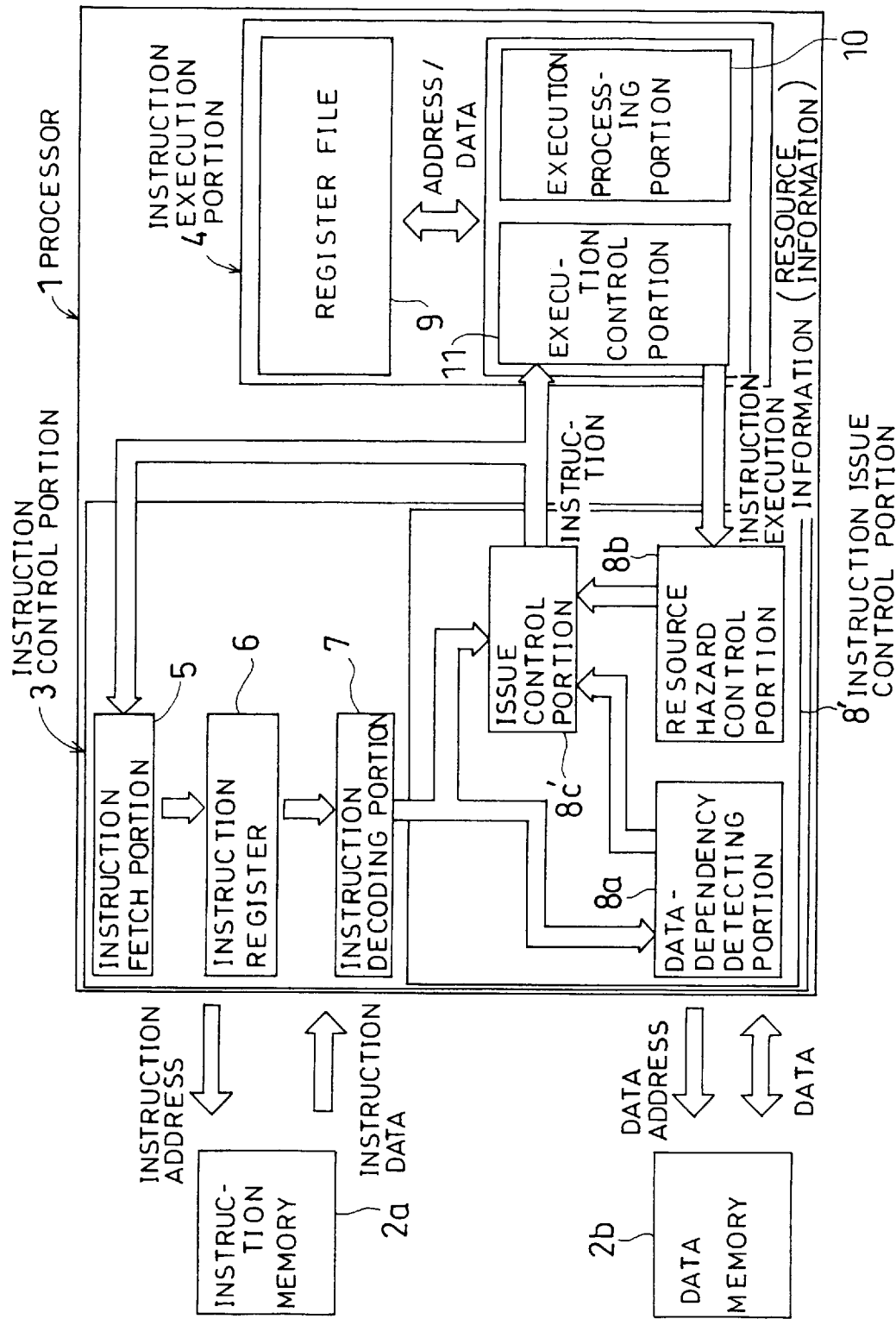
FIG. 15 shows the structure of a principal portion of a processor including the pipeline data processing apparatus according to the second embodiment of the present invention.

FIG. 15 shows the structure of a principal portion of a processor including the above pipeline data processing apparatus of FIG. 14. Since the overall structure of the processor is similar to the structure of the processor of the above first embodiment shown in FIG. 1, only different components will be described below. The processor of FIG. 15 is different from the processor of FIG. 1 only in that the instruction issue control portion 8' with the issue control portion 8c' is provided instead of the instruction issue control portion 8 with the issue control portion 8c. The issue control portion 8c' alters a plurality of data processes to be executed so as to eliminate a data-dependent relationship between the data processes. For example, in a plurality of (two) data processes having the following data-dependent relationship therebetween:

C=A+B

D=E+C, the latter data process is replaced by $$D = E + C$$
$$= E + (A + B)$$
$$= E + A + B.$$

Thereafter, an instruction to perform the data process D is issued so that the data process D is executed by the above pipeline data processing circuit 103 having the 3-input calculator 30". Consequently, a plurality of data processes originally having a data-dependent relationship can be executed simultaneously in parallel as a plurality of data processes having no data-dependent relationship.

Accordingly, in the case where the following six data processes having a data-dependent relationship are executed in the pipeline data processing apparatus of the present embodiment:

C=A+B

D=E+C

G=F+D

H=I+G

J=K+H

L=M+J, instructions to perform the six data processes having a data-dependent relationship can be issued and executed simultaneously under the two effects of elimination of the data-dependent relationship by the pipeline data processing apparatus having the 3-input calculator 30" and insertion of the Dummy cycle described in the first embodiment.

Although the present embodiment has substituted the 3-input calculator 30" for the calculator 30 of the pipeline data processing circuit shown in FIG. 4, it will be appreciated that the calculator 30 of each of the pipeline data processing circuits shown in FIGS. 5, 6, and 7 may be replaced by the 3-input calculator 30".

I claim:

1. A pipeline data processing apparatus comprising:

a plurality of pipeline processing circuits; and an instruction issue control portion for simultaneously issuing a plurality of instructions to perform respective data processes to said respective pipeline processing circuits, wherein each of said pipeline processing circuits comprises:

an input data register for receiving and storing data from the outside and;

a data operating circuit for receiving the data stored in said input data register and performing a specified operation with respect to the input data;

an intermediate pipeline register disposed in a stage subsequent to said data operating circuit;

a final pipeline register disposed in a stage subsequent to said intermediate pipeline register; and a path switching circuit for causing an operation result from said data operating circuit to pass through or bypass said intermediate pipeline register and inputting said operation result to said final pipeline register, said instruction issue control portion adding the number of Dummy stages to be inserted, in each of which nothing is executed, to each of said instructions simultaneously issued, thereby enabling an operation executing stage in which said data operating circuit performs said specified operation to shift to an arbitrary stage in a plurality of pipeline stages.

2. A pipeline data processing apparatus according to claim 1, wherein the plurality of instructions simultaneously issued from the instruction issue control portion include respective instructions to perform at least two data processes having a data-dependent relationship therebetween.

3. A pipeline data processing apparatus according to claim 1, wherein each of said plurality of pipeline processing circuits has an equal number of pipeline stages, some of said plurality of pipeline processing circuits are composed of pipeline processing circuits in each of which said data operating circuit has an internal pipeline register and the other pipeline data processing circuits are composed of pipeline data processing circuits in each of which said data operating circuit has the internal pipeline register.

4. A pipeline data processing apparatus comprising at least one pipeline processing circuit, wherein said pipeline processing circuit comprises:

an input data register for receiving and storing data from the outside;

a data operating circuit for receiving the data stored in said input data register and performing a specified operation with respect to the input data;

an intermediate pipeline register disposed in a stage subsequent to said data operating circuit;

a final pipeline register disposed in a stage subsequent to said intermediate pipeline register; and a path switching circuit for causing an operation result from said data operating circuit to pass through or bypass said intermediate pipeline register and inputting said operation result to said final pipeline register, thereby enabling an operation executing stage in which said data operating circuit performs said specified operation to shift to an arbitrary stage in a plurality of pipeline stages.

5. A pipeline data processing apparatus according to claim 1 or 4, wherein said plurality of pipeline processing circuits are arranged in parallel to each other.

6. A pipeline data processing apparatus according to claim 5, wherein each of said plurality of pipeline processing circuits has an equal number of pipeline stages, some of said plurality of pipeline processing circuits are composed of pipeline processing circuits in each of which said data operating circuit has an internal pipeline register and the other pipeline data processing circuits are composed of pipeline data processing circuits in each of which said data operating circuit has the internal pipeline register.

7. A pipeline data processing apparatus according to claim 1 or 4, wherein the intermediate pipeline register is composed of first and second pipeline registers, said path switching circuit is composed of a selector interposed between said second and final pipeline registers, and said selector receives the operation result from said data operating circuit and respective operation results stored in said first and second pipeline registers, selects any one of the operation results, and outputs the selected one to said final pipeline register.

8. A pipeline data processing apparatus according to claim 7, wherein a stage in which said data from the outside is stored in said input data register is a data reading stage, the stage in which said data operating circuit performs said specified operation and stores the operation result in said first pipeline register is the operation executing stage, a stage in which the operation result stored in said first pipeline register is stored in said second pipeline register is a first pass stage, and a stage in which the operation result stored in said second pipeline register is stored in said final pipeline register is a second pass stage.

9. A pipeline data processing apparatus according to claim 7, wherein in the pipeline data processing circuit that has received the instruction, when the number of Dummy stages to be inserted that has been added to the received instruction is "0", the data input register receives and stores the data from the outside in a first cycle, while the selector selects the operation result stored in the second pipeline register.

10. A pipeline data processing apparatus according to claim 7, wherein in the pipeline data processing circuit that has received the instruction, when the number of Dummy stages to be inserted that has been added to the received instruction is "1", the data input register receives and stores the data from the outside in a second cycle, while the selector selects the operation result stored in the first pipeline register.

11. A pipeline data processing apparatus according to claim 7, wherein in the pipeline data processing circuit that has received the instruction, when the number of Dummy stages to be inserted that has been added to the received instruction is "2", the data input register receives and stores the data from the outside in a third cycle, while the selector selects the operation result from the data operating circuit.

12. A pipeline data processing apparatus according to claim 1 or 4, wherein the intermediate pipeline register is composed of first and second pipeline registers, said path switching circuit is composed of a first selector interposed between said first and second pipeline registers and a second selector interposed between said second and final pipeline registers, said first selector receives the operation result from said data operating circuit and an operation result stored in said first pipeline register, selects either one of the operation results, and outputs the selected one to said second pipeline register, and said second selector receives the operation result selected by said first selector and an operation result stored in said second pipeline register, selects either one of the operation results, and outputs the selected one to said final pipeline register.

13. A pipeline data processing apparatus according to claim 12, wherein a stage in which said data from the outside is stored in said input data register is a data reading stage, the stage in which said data operating circuit performs said specified operation and stored the operation result in said first pipeline register is the operation executing stage, a stage in which the operation result stored in said first pipeline register is stored in said second pipeline register is a first pass stage, and a stage in which the operation result stored in said second pipeline register is stored in said final pipeline register is a second pass stage.

14. A pipeline data processing apparatus according to claim 12, wherein in the pipeline data processing circuit that has received the instruction, when the number of Dummy stages to be inserted that has been added to the received instruction is "0", the data input register receives and stores the data from the outside in a first cycle, while the selector selects the operation result stored in the second pipeline register.

15. A pipeline data processing apparatus according to claim 12, wherein in the pipeline data processing circuit that has received the instruction, when the number of Dummy stages to be inserted that has been added to the received instruction is "1", the data input register receives and stores the data from the outside in a second cycle, while the selector selects the operation result stored in the first pipeline register.

16. A pipeline data processing apparatus according to claim 12, wherein in the pipeline data processing circuit that has received the instruction, when the number of Dummy stages to be inserted that has been added to the received instruction is "2", the data input register receives and stores the data from the outside in a third cycle, while the selector selects the operation result from the data operating circuit.

17. A pipeline data processing apparatus according to claim 1 or 4, wherein said data operating circuit has an internal pipeline register.

18. A pipeline data processing apparatus according to claim 1 or 4, wherein said data operating circuit is composed of an adder or a subtracter each having two or more data input ports.

19. A pipeline data processing method whereby a plurality of instructions, for performing data processes in a series of pipeline processing stages are simultaneously issued and executed by respective pipeline data processing circuits, said method comprising the steps of:

simultaneously issuing, when at least two of the data processes have a data-dependent relationship therebetween, instructions to the respective pipeline data processing circuits for performing the data processes;

executing an antecedent one of said data processes, on which a subsequent one of said data processes is data-dependent, by one of the respective pipeline data processing circuits designated to perform the antecedent data process;

shifting an operation executing stage of said subsequent data process to an arbitrary stage of the series of pipeline processing stages by inserting a number of Dummy stages wherein no operation occurs so that the operation executing stage occurs at least one cycle after the execution of said antecedent data process; and subsequently executing the subsequent data process by one of the respective pipeline data processing circuits designated to perform the subsequent data process.

20. A pipeline data processing method according to claim 19, further comprising the steps of:

judging whether a data-dependent relationship exists between the data processes; and inserting, based on a result of said Judging step, a number of Dummy stages in each instruction that performs a data process that is data-dependent on another data process.

21. A pipeline data processing method according to claim 17, further comprising the step of setting, when the nudging step determines that no data-dependent relationship exists between said data processes, the number of Dummy stages to be inserted to "0".

22. A pipeline data processing method according to claim 20, further comprising the step of calculating, when the judging step determines that a data-dependent relationship exists between said data processes, the number x of Dummy stages to be inserted in accordance with the following equation for each of said pipeline data processing circuits:

$$x = a + b - c$$

where "a" is number of pipeline stages for executing the data process, "b" is the number of Dummy stages to be inserted in the antecedent data process, and "c", is a difference in initiating stages of data processes having a data-dependent relationship therebetween.

23. A pipeline data processing method according to claim 20, wherein, prior to the calculation of the number of Dummy stages to be inserted, the data processes having a data-dependent relationship therebetween are replaced by data processes having no data-dependent relationship therebetween.

24. A pipeline data processing method whereby a plurality of instructions for performing data processes in a series of pipeline processing stages are simultaneously issued and executed by respective pipeline data processing circuits, in the case where at least two of the data processes have a data-dependent relationship therebetween, when the respective pipeline data processing circuits have simultaneously received the plurality of instructions, said method comprising the steps of:

executing an antecedent one of said data processes, on which a subsequent one of said data processes is data-dependent, by one of the respective pipeline data processing circuits designated to perform the antecedent data process;

shifting an operation executing stage of said subsequent data process to an arbitrary stage of the series of pipeline processing stages by inserting a number of Dummy stages wherein no operation occurs so that the operation executing stage occurs at least one cycle after the execution of said antecedent data process; and executing the subsequent data process by one of the respective pipeline data processing circuits designated to perform the subsequent data process.

25. A pipeline data processing method according to claim 19 or 24, wherein each pipeline data processing circuit that receives an instruction executes nothing during each of the inserted Dummy stages and then executes the data process directed by the received instruction.

26. A pipeline data processing method according to claim 18, wherein each of said respective pipeline data processing circuits has at least one pass stage for forwarding an execution result of one of said data processes to a subsequent stage, and, after each of said respective pipeline data processing circuits has executed said data process, a number of pass stages equal to the number of Dummy stages inserted in said received instruction are bypassed.

27. A pipeline data processing method according to claim 25, wherein when any of the pipeline data processing circuits is currently executing one of said Dummy stages, no instructions are issued to the pipeline data processing circuit executing the Dummy stage.

* * * * *

UNITED STATES PATENT AND TRADEMARK OFFICE
CERTIFICATE OF CORRECTION

PATENT NO. : 5,822,561
DATED : October 13, 1998
INVENTOR(S) : Nakajima

It is certified that error appears in the above-identified patent and that said Letters Patent is hereby corrected as shown below:

In the Claims:

Claim 21, line 2, change "17" to --20--, and change "nudging" to --judging--; and Claim 22, line 8, insert --a-- before "number", and insert --subsequent-- before "data".

Claim 26, line 2, change "18" to --25--.

Signed and Sealed this

Sixth Day of February, 2001

Attest:

Q. TODD DICKINSON

Attesting Officer

Director of Patents and Trademarks